AUDIOFREQUENCY REMOTE CONTROL SYSTEM FOR WORKING EQUIPMENT

Filed Jan. 19, 1965

INVENTOR
Muneo YOSHIDA
Masaru INOUE
Tsuyoshi FUKUNAGA
Heikichi OGUCHI
Koichi SHIOYA
BY
McGlew and Toren
ATTORNEYS INVENTORS
MUNEO YOSHIDA
MASARU INOUE
TSUYOSHI FUKUNAGA
HEIKICHI OGUCHI
KOICHI SHIOYA BY McGlew and Toren
ATTORNEYS // United States Patent Office
3,437,997
Patented Apr. 8, 1969

3,437,997
AUDIOFREQUENCY REMOTE CONTROL SYSTEM FOR WORKING EQUIPMENT

Muneo Yoshida, Kobe-shi, Masaru Inoue, Tokyo, and Tsuyoshi Fukunaga, Heikichi Oguchi, and Koishi Shioya, Kobe-shi, Japan, assignors to Mitsubishi Jukogyo Kabushiki Kaishi, Chiyoda-ku, Tokyo, Japan Filed Jan. 19, 1965, Ser. No. 426,570
Int. Cl. H04q *1/02;* H04b *11/00*
U.S. Cl. 340—171 6 Claims

ABSTRACT OF THE DISCLOSURE

A remote control arrangement includes a manually portable transmitter and a receiver mounted on the equipment to be controlled. The transmitter has frequency generators and push buttons for each operation of the equipment, a power source, a modulator, a transmitter and an aerial. The receiver has amplifiers, filters and relays for each operation, as well as a power source for energizing electric motors and electromagnetically released brakes for the motors. For each operation, including the connection of the receiver power source to the receiver, a push button on the transmitter is depressed to successively connect two frequency generators, of different audiofrequencies, to the modulator, the first connected audiofrequency signal establishing a circuit for transmission of the second or later connected audiofrequency signal and then being terminated with the second audiofrequency signal being maintained for as long as the respective push button is depressed. Relay back contacts are provided to prevent subsequent contradictory signals from interfering with operation of the equipment.

The invention relates to a remote operation control system for remote control of operation of cranes, sluices, TV equipment for industrial use, and similar equipment, by the use of a wire or wireless carrier system.

More particularly, the present invention is concerned with a remote operation control system whereby a single working circuit is established by two audible signals, and after formation of said circuit, the operation is maintained by only one of the audible signals, so that the driving section of the equipment can be prevented from erroneous operation upon reception of any other signal which otherwise would actuate said driving section.

According to the invention, a signal input from the transmitting section is received by the receiving section, and the AGC output obtained at the receiving section is combined with two audible signals for remote control of the main power source for a working equipment.

Further, signals on control circuits which give two functions contrary to each other are supplied through counter contacts provided in their own control circuits, and, while the driving section operates on a signal, any signal, other than the predetermined signal, which may be introduced cannot establish a control circuit, so that no counter action of the working equipment can take place.

While the system according to the invention is useful for various working machines and equipment which are remotely controlled through radio or wire communications, it is particularly advantageous to use the system to control travelling of cranes or swivelling and vertical motions of crane booms for loading or unloading freight or other materials. For this reason, the present invention will be described in further detail with reference to an embodiment thereof shown in the accompanying drawings as applied to the operation control of a crane.

In the accompanying drawings showing an embodiment of the invention:

Figure 1:
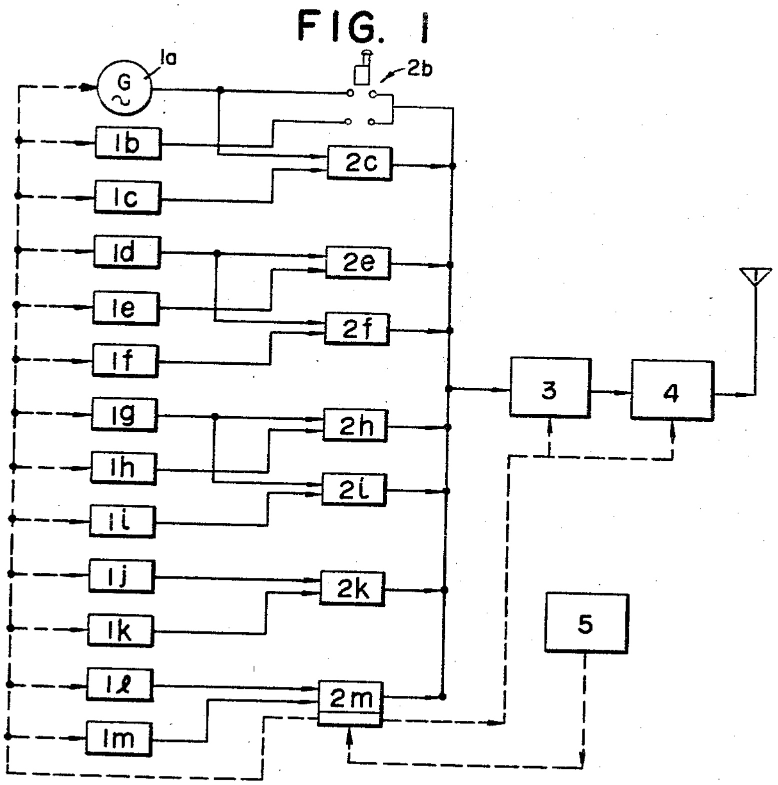
FIG. 1 is a schematic diagram of the structure of the transmitting section of the system.
Figure 2:
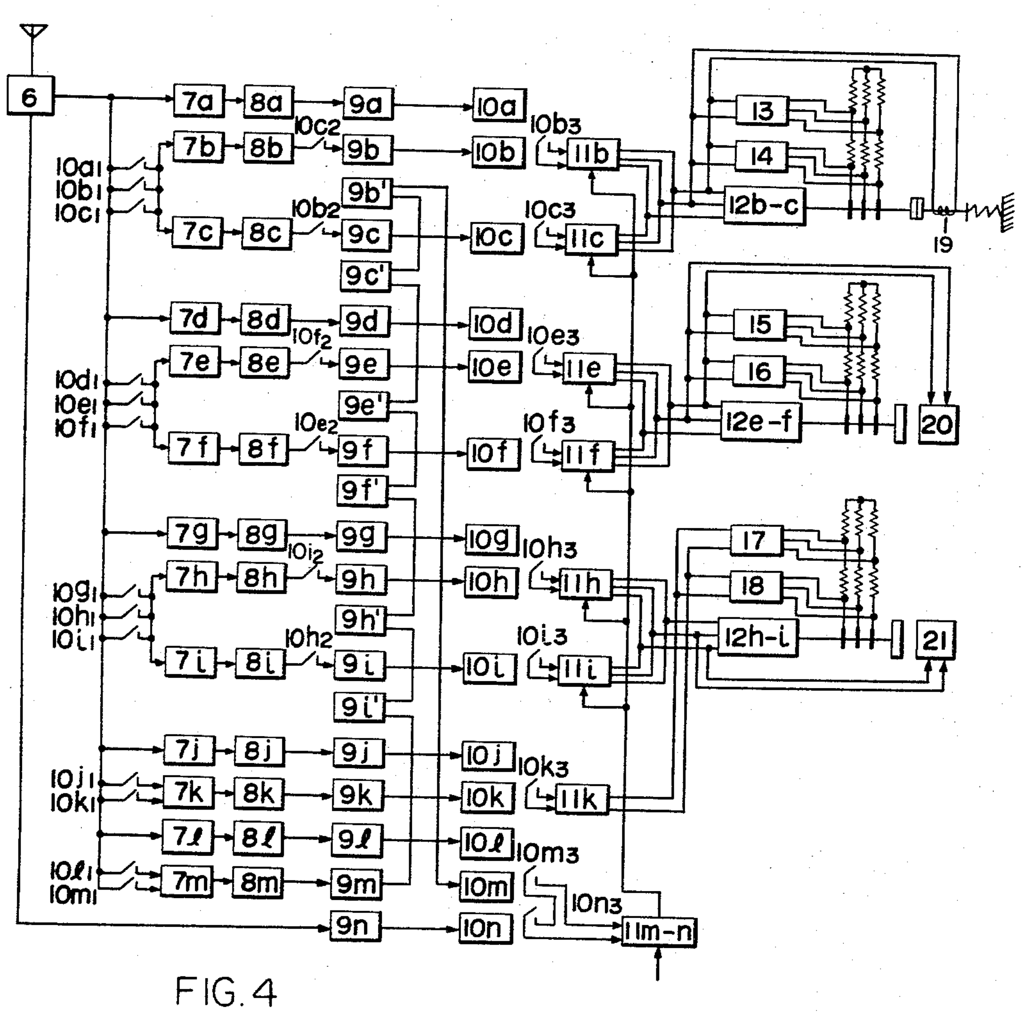
FIG. 2 is a schematic diagram of the structure of the reception control section of the system.
Figure 4:
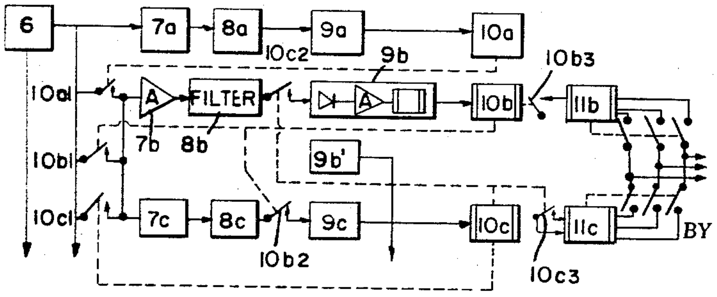
FIG. 4 is a more detailed schematic diagram of one channel of the control section shown in FIG. 2.

In the drawings, FIG. 1 shows schematically the structure of the transmission control section of the system, and FIG. 2 the structure of the receiving section. The section shown in FIG. 1 is made as a compact unit for portable use, so that the operation control is accomplished by an operator maneuvering this unit at a suitable point on the ground, whereas the receiving control section in FIG. 2 is mounted on a crane and is used to control the operation of the crane in response to the signal from the transmitting control section.

The transmitting control section shown in FIG. 1 consists of piezo-tuning fork oscillators 1*a*–1*m*, staggered-contact push button switches 2*b*–2*m*, a modulating means 3, a supershort wave transmitting means 4, and dry-cell power source 5. The piezo-tuning fork oscillators 1*a*–1*m* generate audible signals of different frequencies, and the 13 different signals are taken out through the 8 staggered-contact push buttons 2*b*–2*m* in combinations of two waves, which are then introduced into the ultrashort-wave transmitting means 4 through the modulating means 3. Thus, ultrashort wave signals are sent out through the aerial thereby to maneuver the crane.

The receiving control section shown in FIG. 2 consists of a ultrashort wave receiving means 6, audiofrequency amplifying means 7*a*–7*m*, piezo-tuning fork filters 8*a*–8*m*, amplifying, detecting and small relay means 9*a*–9*n* and 9*b'*–9*i'*, repeating relay means 10*a*–10*n*, starting and stopping relay means for normal and reverse actions 11*b*–11*i*, an accelerating relay changeover means 11*k*, a main power source control relay means 11*m*–*n*, motor means 12*b*–*c*, 12*e*–*f*, and 12*h*–*i*, accelerating timer relay means 13, 14, 15, 16, 17, and 18, and electromagnetic brakes 19, 20, and 21.

The audiofrequency signals received by the receiving means 6 are amplified by the means 7*a*–7*m*, and divided into 13 circuits by the piezo-tuning fork filter means 8*a*–8*m*. The separated signals are amplified and detected by the amplifying and detecting means 9*a*–9*m*, so that the detected outputs actuate the small relays and, through their contacts, further actuate the repeating relays 10*a*–10*m*, which in turn operate the normal-counter action starting and stopping relays 11*b*–11*k*, and finally the electric motors 12*b*–*c*, 12*e*–*f*, and 12*h*–*i*. Simultaneously with starting of the motors, the electromagnetic brakes 19, 20 and 21 are disengaged, and the accelerating relays 13–18 are energized to accelerate the motors in two steps. When the incoming audiofrequency signals are discontinued, the relays of the block corresponding to the specific frequencies are reset to stop the motors, and at the same time to activate or engage the electromagnetic brakes, thereby to control the force of inertia.

The piezo-tuning fork filter section is composed of piezo-tuning fork filters characterized by attenuation of about 23 db for detuning by one cycle and which are capable of eliminating signals outside predetermined bands.

In FIG. 2, the groups *a*, *b*, and *c* represent the groups for hoisting and lowering weights, the groups *d*, *e*, and *f* represent those for limited swinging of the crane, and the groups *g*, *h*, and *i* represent those for major lateral travelling of the crane. The groups *j* and *k* represent those for speed change-over, and the groups *l*, *m*, and *n*, the working circuits for making the crane ready for operation.

Next, for the convenience of illustration, the functions of the system embodying the invention will be described with reference to the procedure for operation control of a crane. To begin with, the functions for making the crane ready for operation will be explained.

As push button switch 2*m* (FIGS. 1 and 3) for the power source is depressed, contacts of the power circuit are closed and power, from source 5, is supplied to oscillators or frequency generators 1*a*–1*m*, modulator 3 and transmitter 4, thereby activating these components. The connections are indicated by dotted lines in FIG. 1 and by solid lines in FIG. 3. By virtue of depression of push button switch 2*m*, the signal from oscillator 1*l* is initially applied to modulator 3 through the upper section of switch 2*m*. Immediately before the signal from oscillator 1*l* is discontinued or interrupted, another signal, from oscillator 1*m*, is applied to modulator 3 and, when the signal from oscillator 1*l* is discontinued, only the signal from oscillator 1*m* is applied as long as push button switch 2*m* is depressed. Push button switch 2*m* is mechanically locked in the fully depressed position, and the signal of oscillator 1*m* is transmitted, as a modulation of the carrier wave, through the transmitter 4.

This radio wave is received by the receiving means 6, and, by the AGC output in the receiver, the small amplifying-detecting relay means 9*n* is actuated, and then, through its contacts, the repeating relay 10*n* is activated to close its contact 10*n*3.

At the same time, signals having frequencies corresponding to those of signals 1*l* and 1*m* are derived as the audiofrequency output of receiver 6. The signal from frequency generator 1*l* is amplified by amplifying means 7*l*, passed through piezo-tuning fork filter 8*l*, and further amplified and detected by the component 9*l*. The detected signal in component 9*l* actuates the associated small relay and, through the contacts of the latter, repeater relay 10*l* is energized to close contact 10*l*1. Upon closure of contact 10*l*1, the signal from oscillator or generator 1*m* is continually applied to amplifier 7*m* as long as push button switch 2*m* remains fully depressed. This signal is passed through filter 8*m* and applied to component 9*m* to activate the associated small relay. The contacts of this small relay are connected in a series circuit including the back contacts of the small relays associated with components 9*b*′, 9*c*′, 9*e*′, 9*f*′, 9*h*′, and 9*i*′, and this series circuit energizes relay 10*m* to close contact 10*m*1 in parallel with contact 10*l*1, to maintain the signal circuit, as well as simultaneously to close contact 10*m*3. A series circuit is thus closed through contacts 10*m*3 and 10*n*3, to actuate main power switch 11*m*–*n* to place the equipment in condition for operation.

Now, if the button 2*m* on the transmitting control side is released, the signal transmission is discontinued, all the relays are reset and the main power source is cut off, bringing the crane back to its state before starting of an operation.

Figure 3:
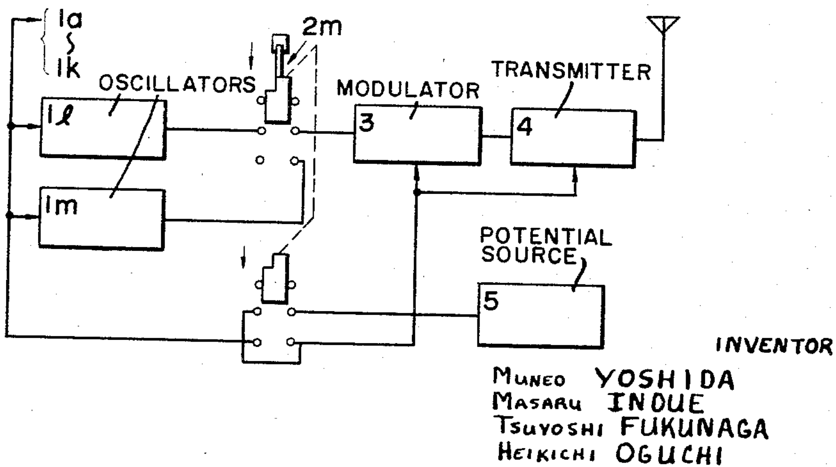
FIG. 3 is a schematic diagram illustrating a part of the working circuit shown in FIG. 1.

More specifically, if the staggered push button 2*m* is depressed, a radio wave is sent out from the transmitting means 4. The wave is received by the receiving means 6, and the AGC output obtained at the receiving means 6 actuates the medium-size relay 10*n*. Meanwhile, as push button 2*m* is depressed, it closes the contact of the piezo-tuning fork oscillator 1*l* and that of the modulating means 3, as indicated in FIG. 3, to transmit an audiofrequency signal, for example of 1500 c./s. Further, if the button 2*m* is kept depressed, it opens the contacts of oscillator or frequency generator 1*l* because of the staggered arrangement of the button, and closes the contacts connecting the piezo-tuning fork oscillator 1*m* to the modulating means 3, so that a signal of a certain audiofrequency, for example of 2100 c./s. is sent out in the wake of the first signal from oscillator 1*l*, which in turn is subjected to FM modulation. Thus, signals are obtained from the receiving means 6, in the order of 1500 c./s. followed by 2100 c./s., and, by the signals, the repeater relays 10*l* and 10*m* are actuated. Thereby, the electromagnetic switch 11*m*–*n* is actuated, thereby to establish the main power circuit.

Next, the control of the hoisting operation will be described.

As the push button (for hoisting operation) is depressed, the staggered contacts operate in such a way that the audiofrequency signal, 1650 c./s., of oscillator 1*a* is initially applied to modulating means 3. Immediately before this signal is cut off, it is overlapped by the signal, 1760 c./s., of oscillator 1*b*. Then, the signal of oscillator 1*a* is cut off, while only the signal of oscillator 1*b* continues to be supplied to modulating means 3, so that a carrier wave instantaneously modulated by the audiofrequency signal of 1*a* is emitted from the transmitting means 4, and from thereon the carrier wave modulated by the audible signal of oscillator 1*b* is continuously transmitted.

When this radio wave is received by the receiving means 6, a signal sequence in the order from 1*a* to 1*b* is obtained as the audiofrequency output. If this signal is amplified by amplifier 7*a* and filtered by filter 8*a*, the latter passes only the signal 1*a* to the amplifying-detecting means 9*a*, and the detected output energizes the associated small relay, whose contact in turn operates the repeater relay 10*a*, and the contact 10*a*1 is closed. While the contact 10*a*1 is closed, the signal from oscillator 1*b* continues to come in. Therefore, this signal is applied to amplifier 7*b* through the contact 10*a*1. The amplified signal is filtered by filter 8*b*, and the signal component which has passed through the filter is applied to the amplifying-detecting means 9*b* through the back, normally closed contact 10*c*2 of the repeating relay 10*c*. By the detected output, the associated small relay is actuated, whose contact in turn operates the repeater relay 10*b*, and the contact 10*b*1 is closed, to maintain the input signal circuit, in parallel with the contact 10*a*1. Thus, even if the signal from oscillator 1*a* is discontinued and the repeater relay 10*a* is reset, the circuit of the group *b* main the working state. Therefore, the normal-counter starting-stopping relay 11*b* is actuated by closure of contact 10*b*3, and simultaneously the normally engaged electromagnetically released brake 19, connected in parallel with the motor energizing circuit, is energized to release or disengage, thereby permitting the motor 12*b*–*c* to run in the hoisting direction. Also, the timer accelerating relays 13 and 14, connected in parallel with the brake circuit, are energized, and they automatically accelerate the motor as they short the rotor resistances of the motor 12*b*–*c* at intervals of 2 to 4 seconds each.

If the push button 2*b* is released, the circuit is opened and the signal from oscillator 1*b*, which has continuously been supplied, is interrupted, causing the start-stop relay 11*b* to be reset and power supply to the motor 12*b*–*c* to be cut off. Simultaneously with stopping of the motor, the electromagnetically released brake 19 is deenergized, thereby applying the brake to the motor 12*b*–*c*. Also the timer accelerating relays 13 and 14 are reset.

In the case of lowering the crane arm, the button 2*c* is depressed. Then, on the same principles as for hoisting, the normal-counter starting relay 11*c* is actuated, thereby to drive the motor 12*b*–*c* in the crane lowering direction. If the button 2*c* is released, the signal from oscillator 1*c* is interrupted, and the motor 12*b*–*c* is stopped according to the same principles as in the case of hoisting. As the groups *a*, *b*, and *c* operate in exactly the same manner for lowering as for hoisting, the description of the functions of the groups *a*, *b*, and *c* in lowering will be omitted.

Next, operation for preventing counter action will be described.

While the system is still in operation for the hoisting run, the push button switch 2*c* for lowering the crane is depressed. Then, on the same principles as above referred to, signals in the order from 1a to 1c are successively sent out, and the signals received by the receiving means 6 are applied to amplifier 7c and thence to filter 8c. However, since the contact 10b2 is a back contact of the repeater relay 10b, and because the other contacts of relay 10b remain closed for the hoisting operation, the contact 10b2 is kept open, and the signal 1c is not supplied to the components 9c and 10c. Hence any possibility of crane lowering, or the reverse operation, is precluded.

The operating circuits of groups *a* and *b* are established by signals of certain audiofrequency, for connection or disconnection of the driving means, or the motor 12b–c, with the load power circuit. While the signals operate the motor 12b–c either in the hoisting or lowering direction, another audible signal, for example an operating signal for an action counter to the above action may be applied. In this case, however, the other signal fails to actuate the repeater relay 10c provided in the working circuit of the group *c*, because the back contact 10b2 in the working circuit is kept open.

Hence, while the hoisting or lowering operation of the crane is in progress, any erroneous operation, that is, lowering or hoisting operation counter to the above, can be prevented.

The operation of the circuitry during long-distance lateral movement and change of operating speed of the crane will now be described.

The lateral movement of the crane is controlled by the groups *g*, *h*, and *i*. Since the same principles as above illustrated apply, descriptions of the starting and stopping actions are omitted. Now, while the crane is being moved sidewise, the push button 2k is depressed thereby to transmit the signal 1j–1k from the transmission control section. The signal is received by the receiving means 6, and is used to set up the operating circuit of the group *j*, that is, the circuit constituted by the amplifier 7j, piezo-tuning fork filter means 8j, amplifier-detector means 9j, and repeating relay 10j. Then, as the contact 10j1 is closed, the operating circuit of the group *k*, that is the circuit constituted by the amplifier 7k, piezo-tuning fork filter means 8k, amplifier-detector means 9k, and repeater relay 10k, is thereby completed. Simultaneously, operation is started by closure of the contacts 10k1 and 10k3, and the accelerating relay 11k is energized. Also, the starting circuit of the accelerating relays 17 and 18, connecetd in parallel to accelerating relay 11k, is either opened or closed, so that the lateral movement velocity of the crane can be changed either to a low or a high constant speed.

The function of the system in preventing erroneous operation due to noise will now be explained.

By dint of this function, all the motors incorporated in the main power circuit, other than the one in controlled operation, are kept from being erroneously started by any noise signal.

The amplifying-detecting small relay means 9b, 9c, 9e, 9f, 9h, and 9i are so set that they are respectively actuated only by signals of specific operating frequencies at certain constant levels. The amplifying-detecting small relay means 9b′, 9c′, 9e′, 9f′, 9h′, and 9i′ are so set that they are respectively actuated by signals at higher levels than the working levels of the corresponding amplifying means. If, for example, the relay means 9b operates normally with a signal of a certain level, any noise signal of the same frequency which may be mixed in will raise the resultant signal level and, while component 9b operates irrespective of the rise of the level, the relay 9b′ will be actuated upon the rise of the noise signal level up to the working level of relay 9b′. The back contacts of the relays 9b′, 9c′, 9e′, 9f′, 9h′, and 9i′ are all connected in a serial circuit, connected with the 9m–10m circuit which controls the main power source. If therefore one of the relays 9b′, 9c′, 9e′, 9f′, 9h′, or 9i′, is actuated by chance, the serial closed circuit is opened and the 9m–10m circuit is interrupted, with the result that the main power source is cut off and the crane is stopped while in the operative state.

If no more noise is mixed in, that one of the relays 9b′ through 9i′ which has been in action is reset, and the 9m–10m main power control circuit is closed. However, the contact 10m1 which completes the signal input circuit of the group *m*, remains open because the 9m–10m circuit was interrupted by the actuation of one of the relays 9b′ through 9i′. Hence the group *m* will not be actuated, and the main power source cannot be automatically reconnected into the system.

To restart the operation, the push button switch 2m is released and then depressed. This connects the main power source again into the system and in operation, in accordance with the operating principles described for preparation of the crane for operation.

With large cranes heretofore in use, difficulties have been met in the course of operation as the operator in the operator's cabin on the crane has to maneuver the equipment while watching the cargo or goods from a considerable height, or sometimes even in response to signs given by another workman on the ground. According to the present invention, specifically the embodiment above described, the crane operator has only to carry the portable transmission control box and maneuver it while watching the cargo condition and the environmental conditions at a suitable location on the ground, so that the crane can be operated, from afar, in any desired operating directions. Thus, not only is the efficiency of loading and unloading work enhanced, but also the operator can handle the crane safely and easily.

As hereinabove described specifically with reference to a preferred embodiment thereof, the present invention relates to a remote operation control system comprising a transmitting section which has piezo-tuning fork oscillators and staggered push buttons for selectively overlapping and transmitting signals of different audio frequencies, and a receiving section for receiving those signals, the receiving section being equipped with piezo-tuning fork filter means which, after establishment of an operating circuit, provided with piezo-tuning fork filter means which pass only one audiofrequency signal of the input signals into the receiving section, with such one signal, pass only the other audiofrequency signal of the input signals, so that a control circuit which transmits such other signal to the drive means is maintained by such other audiofrequency signal for effecting the operation of said drive means. Thus, two specific signals of different audiofrequencies are selectively transmitted in an overlapped relationship, and after one of the signals has established a working circuit, a control circuit is maintained by the other signal in order that the drive means can be controlled in operation. Any signal other than the one above specified, or any noise signal which may be introduced while the drive means is running, can be eliminated, and only the signal of a specific audiofrequency can be filtered, thereby to prevent any erroneous operation of the drive means.

Also, the present invention relates to a remote operation control system comprising a transmitting section having piezo-tuning fork oscillators and staggered contact push buttons and adapted for selectively transmitting several signals of different audio frequencies in an overlapped relationship, a receiving section for receiving those signals, a piezo-tuning fork filter means which, upon establishment of a first operating circuit having a piezo-tuning fork filter means which passes only one audiofrequency signal of the input signals from the receiving section, passes only the other audiofrequency signals, a control circuit which sustains the circuit on receipt of said signal for controlling the drive means, an operation holding circuit which sustains so as to open or close the main power source in response to the instruction from said receiving section, and a control circuit which, upon establishment of a second operating circuit equipped with a piezo-tuning fork filter means which passes only a certain audiofrequency signal of said input signals, passes only the audiofrequency signal other than said specific one of said input signals in order to sustain its own circuit therewith, said operation holding and control circuits being established by the instruction from said receiving section and by certain audiofrequency signals of the input signals, thereby controlling the main power circuit by opening or closing the same, while, at the same time, enabling said control circuit to sustain itself with the other audiofrequency signals of said input signals and to control the drive means. Operation control of the driving means is accomplished by opening or closing the main power circuit by means of the AGC output obtained at the receiving section and by the two audiofrequency signals, and by connecting or disconnecting the driving means relative to the load power source by means of the other two sets of audiofrequency signals. Thus, not only is remote control of a working equipment possible from any desired position, but safety in operation is ensured. Also, because signals required for operating the equipment are fed in by the use of staggered push buttons, the equipment can be started and stopped with great facility. Moreover, since the equipment can be operated entirely through maneuvering of the push buttons, any inching operation of the equipment is made possible by simply depressing or releasing the buttons.

Further, the present invention relates to a remote operation control system comprising a transmitting section which has piezo-tuning fork oscillators and staggered push buttons and is adapted for transmitting several different audiofrequency signals selectively in overlapped relationships, a receiving section for receiving those signals, an operating circuit having a piezo-tuning fork filter means which passes only one audiofrequency signal of the input signals from said receiving section, first and second control circuits provided with piezo-tuning fork oscillators which pass only the other audiofrequency signals of said input signals after the establishment of said operating circuit, said control circuits sustaining themselves for controlling the drive means, said first and second control circuits being arranged in parallel with each other, either of said circuits being provided with relay back contacts which, while either one of the circuits is formed, keep the other circuit from being established, thereby to prevent any reverse action of the drive means. With such structure, the signals on control circuits which direct actions counter to each other are supplied through counter contacts provided on their respective control circuits, so that, while the drive means of the working equipment is running, that is, while the control circuit is connected, the other control circuit provided in parallel with said first circuit is kept open. Therefore, even if the operator depresses by mistake any push button which transmits a signal for a reverse action, the signal is not fed in the control circuit to be established by the erroneous signal, and the danger of reverse operation is prevented, assuring safe operation of the equipment.

What we claim:

1. A remote control system, for function effecting components of controlled equipment, comprising, in combination, a control signal transmitting section including audiofrequency generating means generating respective different audiofrequency signals, signal transmission means, and pushbutton means connected between said generating means and said transmission means and selectively operable to connect said generating means and said transmission means to a first source of electric potential and to connect said generating means to said transmission means; at least one component to be controlled; and a control signal receiving section including signal receiving means, filter means connected to the output of said receiving means and passing said respective different audiofrequency signals, relay means connected to said filter means and activated responsive to said respective different audiofrequency signals, a second source of electric potential, and switch means connected to said relay means and operable, responsive to respective actuation of said relay means, to connect an associated component to said second source; said signal receiving section, responsive to receipt of a respective first audiofrequency signal, establishing a circuit for transmission of the associated second audiofrequency signal to said relay means to operate said switch means to connect a respective component to said second source; said audiofrequency generating means comprising a plurality of audiofrequency generators each generating a respective different audiofrequency; said pushbutton means comprising a plurality of pushbuttons, each respective to a different function of said equipment, and each connected between two frequency generators and said transmission means; each pushbutton, when operated, initially connecting a first of its associated generators to said transmission means, then connecting the second of its associated generators to said transmission means, and then disconnecting the first of its associated generators from said transmission means while maintaining the second of its associated generators connected to said transmission means.

2. A remote control system, as claimed in claim 1, in which said filter means comprises a plurality of filters each passing a respective different one of said audiofrequency signals; said relay means including a plurality of relays, each filter having a respective different relay connected to its output; said switch means comprising a plurality of switches each controlled by at least one respective relay; said switches including a pair of switches for each component and controlling energization of the associated component and the respective direction of operation thereof, and further including a switch controlling connection of said second source of potential to said switches.

3. A remote control system, as claimed in claim 2, in which said pushbuttons include a first pushbutton controlling connection of said first source of electric potential to said generators and to said transmission means and, through said receiving section, controlling connection of said second source of potential to said switches; said switch controlling connection of said second source of potential to said switches of said receiving section having a series control circuit therefor including contacts of two relays; one of said two relays being operated to close its contact in said series circuit responsive to receipt of any signal by said receiving means, and the other of said two relays being operated to close its contact in said series circuit responsive to receipt of the second audiofrequency signal transmitted responsive to operation of said first pushbutton over a circuit established by operation of a third relay responsive to receipt by said receiving means of the first audiofrequency signal transmitted responsive to actuation of said first pushbutton.

4. A remote control system, as claimed in claim 2, in which for each function of said power machinery a first relay and a second relay are provided, said first relay being connected directly to said receiving means through a respective filter, and having front contacts controlling connection of the second relay and its respective filter to said receiving means.

5. A remote control system, as claimed in claim 4, in which, for each function, the connection circuit of the second relay includes a back contact of the second relay associated with an opposing function, whereby interference with one function by an opposing function is prevented.

6. A remote control system, as claimed in claim 3, in which the circuit for energizing said other relay includes, in series therein, back contacts of noise level responsive relay means which, upon the occurrence of electronic noise having a level which is a predetermined amount in excess of the level of said audiofrequency signals, are energized to deactivate said other relay to open the switch connecting said second source of potential to said switches.

References Cited

UNITED STATES PATENTS

| | | | |
|---|---|---|---|
| 3,114,127 | 12/1963 | Ramsey | 343—225 |
| 3,371,316 | 2/1968 | Johnson | 340—171 |

| | | | |
|---|---|---|---|
| 3,263,141 | 7/1966 | Nicola. | |

FOREIGN PATENTS

| | | | |
|---|---|---|---|
| 693,452 | 7/1963 | Great Britain. | |

DONALD J. YUSKO, *Primary Examiner.*

U.S. Cl. X.R.

343—225